(12) United States Patent
Zuehl et al.

(10) Patent No.: US 8,448,763 B2
(45) Date of Patent: May 28, 2013

(54) HOUSING-PISTON ASSEMBLY FOR A COUPLING DEVICE AND ASSEMBLY METHOD

(75) Inventors: Carsten Zuehl, Schweinfurt (DE); Mike Scordino, Northville, MI (US); Claus Umnus, Northville, MI (US); Juraj Cuperka, Northville, MI (US); Bernd Reinhardt, Schweinfurt (DE); Ray Hamblin, Northville, MI (US); Oliver Walter, Northville, MI (US); Matthias Münch, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 603 days.

(21) Appl. No.: 12/687,740

(22) Filed: Jan. 14, 2010

(65) Prior Publication Data

US 2010/0193314 A1    Aug. 5, 2010

Related U.S. Application Data

(60) Provisional application No. 61/149,791, filed on Feb. 4, 2009.

(30) Foreign Application Priority Data

Feb. 18, 2009    (DE) .......................... 10 2009 000 959

(51) Int. Cl.
  *F16H 45/02*    (2006.01)
(52) U.S. Cl.
  CPC ..................................... *F16H 45/02* (2013.01)
  USPC .......................... 192/3.29; 29/524.1; 72/466.5
(58) Field of Classification Search
  USPC ............................................. 72/466.5; 227/61
  See application file for complete search history.

(56) References Cited

U.S. PATENT DOCUMENTS

| | | | | |
|---|---|---|---|---|
| 4,567,974 A | * | 2/1986 | Birk | 192/70.18 |
| 5,826,690 A | | 10/1998 | Maingaud | |
| 6,065,577 A | * | 5/2000 | Arhab et al. | 192/70.18 |
| 6,193,036 B1 | * | 2/2001 | Arhab et al. | 192/3.29 |

FOREIGN PATENT DOCUMENTS

DE    4111963    3/2004

* cited by examiner

*Primary Examiner* — Rodney Bonck
(74) *Attorney, Agent, or Firm* — Cozen O'Connor

(57) ABSTRACT

A housing-piston assembly for a coupling device, especially a wet-running, multi-plate clutch or a bridging clutch of a hydrodynamic coupling device, wherein the piston (4) is attached to a housing (2) by means of connecting elements (8) in such a way that it has a certain freedom of movement, and rivets (10, 12) are provided as fastening elements between the piston (4) and the connecting elements (8) and/or between the connecting elements (8) and the housing (2), and wherein at least one support element (20, 36, 70, 86) can be positioned in a riveting position between the piston (4) and the connecting elements (8) and/or between the connecting elements (8) and the housing (2) in such a way that anvil sections (18, 44, 74, 92) of the support element (20, 36, 70, 86) lie behind the set heads (14) of their associated rivets (10, 12). A method of assembling a housing-piston assembly is also provided.

33 Claims, 9 Drawing Sheets

Fig. 4a
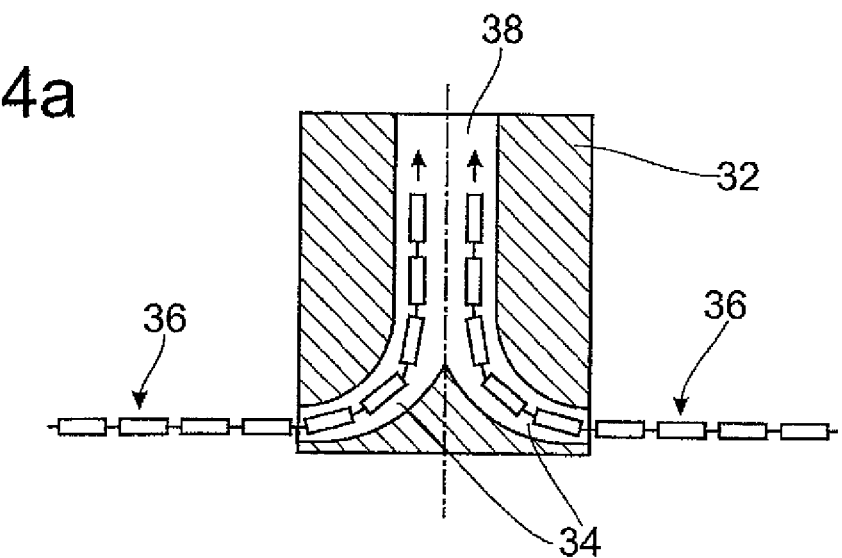
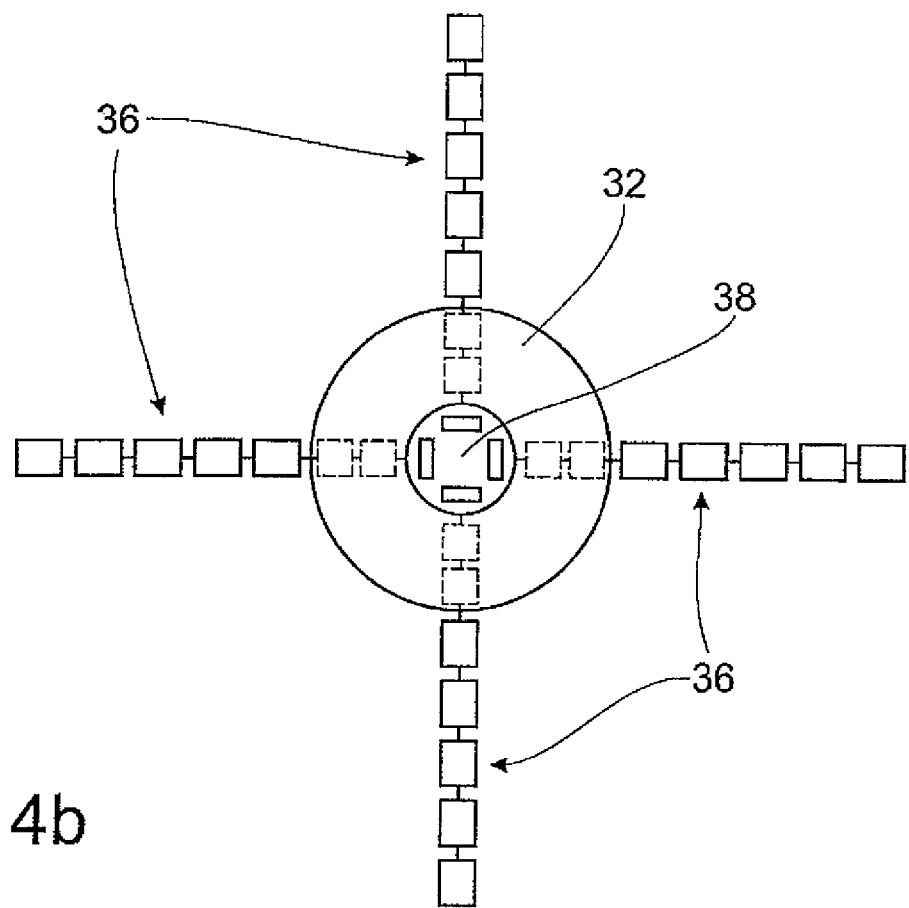
Fig. 4b

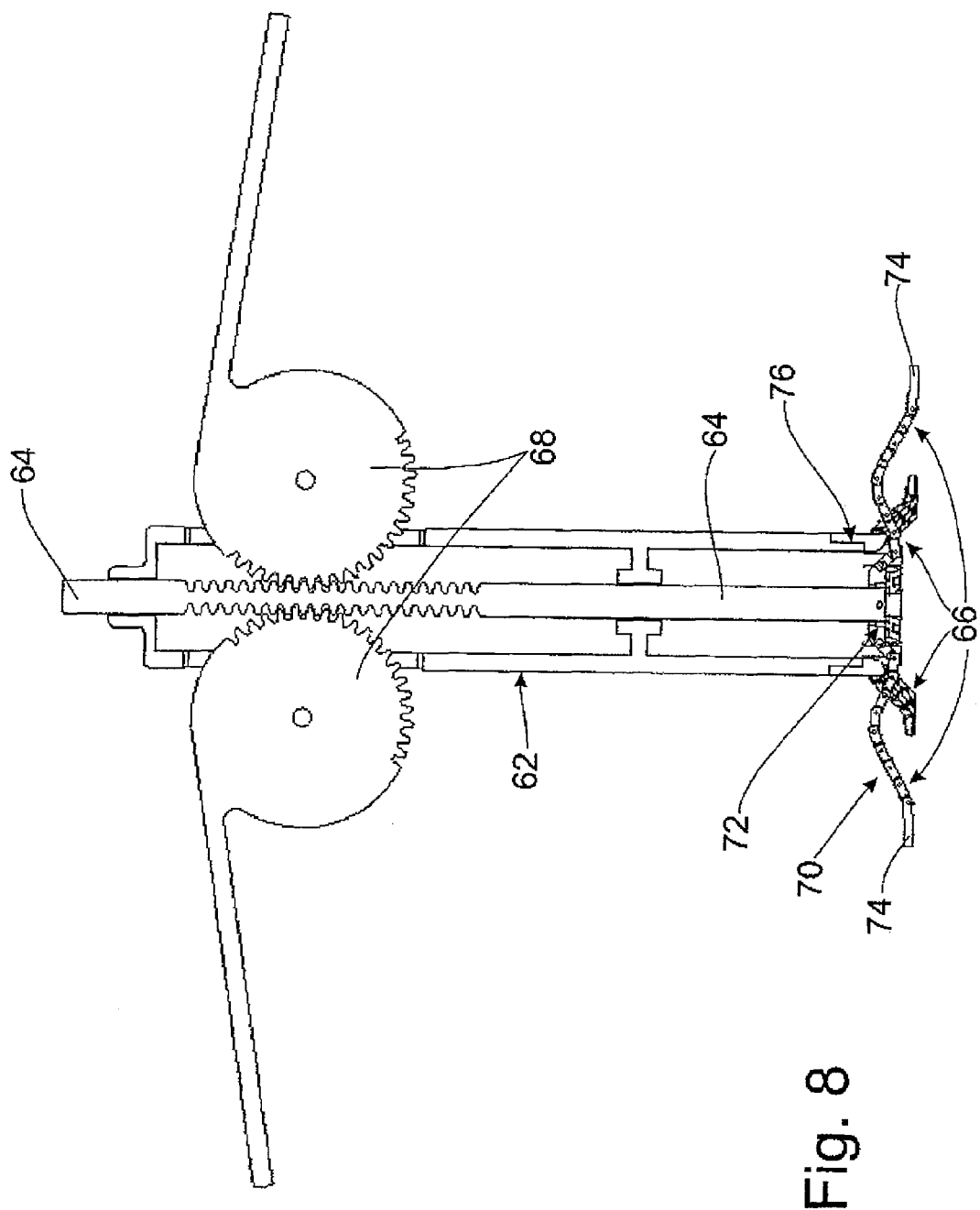

HOUSING-PISTON ASSEMBLY FOR A COUPLING DEVICE AND ASSEMBLY METHOD

RELATED APPLICATIONS

This application claims priority from U.S. Provisional Patent Application Ser. No. 61/149,791 which was filed on Feb. 4, 2009 and claims priority of German Application No. 10 2009 000 959.0 which was filed on Feb. 18, 2009.

BACKGROUND OF THE INVENTION

1. Field of the Invention

The invention pertains to a housing-piston assembly for a coupling device, especially a wet-running multi-plate clutch or a bridging clutch of a hydrodynamic coupling device, where the piston is attached to a housing by connecting elements in such a way that it has a certain freedom of movement and rivets are provided as fastening elements between the piston and the connecting elements and/or between the connecting elements and the housing, a support element for use in a housing-piston assembly of this type, an auxiliary device for riveting a housing-piston assembly of this type, and a method for assembling a housing-piston assembly of this type, in which, in a first step, the connecting elements are provided on one of the two assemblies, i.e., either on the piston or on the housing and, in a second step, the connecting elements are riveted to the other assembly, i.e., to the housing or to the piston.

2. Description of the Related Art

A housing-piston assembly of the type indicated above and a corresponding assembly method are disclosed in the international publication WO 99/01683 and in the corresponding DE 198 81 000 T1. These publications pertain to a hydrodynamic torque converter, which comprises a torque converter with a turbine wheel and a pump wheel in the interior of a sealed, oil-filled housing and a lockable clutch, wherein, by means of the lockable clutch, the turbine wheel can be mechanically connected nonrotatably to the pump wheel. The housing, which rotates during operation, forms the input element of the torque converter, whereas a hub, which is connected nonrotatably to the turbine wheel, forms the output element of the torque converter. To actuate the lockable clutch, a piston is provided, which is connected nonrotatably to the housing, which serves as a counterpiston, and is designed so that it has a certain freedom of axial movement with respect to the housing. The nonrotatable connection between the piston and the housing is accomplished by means of connecting elements, which are designed as leaf spring-like tongues. These leaf spring-like tongues are connected by rivets both to the piston and to the housing. The riveting can proceed in such a way that the tongues are riveted to the housing first, e.g., by means of rivet pins which have already been formed on the housing. So that the tongues can then be riveted to the piston, the rivets being used for the purpose must be accessible on both sides, so that the riveting tool and the holder-up can be brought into position. For this purpose, access holes, which are closed off by a plug after the riveting, are provided in the housing. If, conversely, the tongues are riveted to the piston first and then to the housing in the second step, corresponding access holes are provided in the piston, which can also be closed off after riveting by means of plugs.

In either case, therefore, after the actual riveting, an additional work step is required, namely, the insertion of plugs into the access holes. Similarly, these holes must be provided appropriately during the production of the housing or of the piston such as by the introduction of bores. The possibility cannot be excluded, furthermore, that the strength of the structures might be impaired by the holes which must be provided or even that leaks can result.

SUMMARY OF THE INVENTION

It is therefore an object of the present invention to provide the possibility of assembling a housing-piston assembly of the type indicated above for a coupling device without the need for access holes in the housing and/or in the piston as prescribed in accordance with the prior art.

This object is achieved by a housing-piston assembly for a coupling device, especially a wet-running multi-plate clutch or a bridging clutch of a hydrodynamic coupling device, where the piston is fastened to a housing by connecting elements in such a way that it has a certain freedom of movement, and rivets are provided as fastening elements between the piston and the connecting elements and/or between the connecting elements and the housing, where at least one support element can be brought into a riveting position between the piston and the connecting element and/or between the connecting element and the housing in such a way that anvil sections of the support element lie behind the set heads of their associated rivets. The connecting elements cited above can be spring elements, especially leaf springs.

The object indicated above can also be achieved by a support element for use in a housing-piston assembly for a coupling device, especially a wet-running multi-plate clutch or a bridging clutch of a hydrodynamic coupling device, which support element comprises anvil sections, which lie behind the set heads of the rivets between the piston and the connecting elements and/or between the connecting elements and the housing after the support element has been brought into a riveting position in the housing-piston assembly.

The object is also achieved by a method for assembling a housing-piston assembly of a coupling device, especially a wet-running multi-plate clutch or a bridging clutch of a hydrodynamic coupling device, where the piston is attached to a housing by means of connecting elements in such a way that it has a certain freedom of movement and rivets are provided as fastening elements between the piston and the connecting elements and/or between the connecting elements and the housing, where, in a first step, the connecting elements are provided on one of the assemblies, i.e., either on the piston or on the housing, and, in a second step, the connecting elements are riveted to the other assembly, i.e., to the housing or to the piston, where, before the riveting in the second step, at least one support element can be brought into a riveting position between the connecting elements and the other assembly, i.e., either the housing or the piston, in such a way that anvil sections of the support element lie behind the set heads of their associated rivets, whereupon the connecting elements are riveted to the other assembly. It is of no importance to the execution of the method how the connecting elements are provided on the assembly in question in the first step. The connecting elements can also be riveted to the first assembly, for example, or they can be provided by some other type of fastening method such as welding, screwing, etc., or they can even be formed on this assembly.

As a result of the introduction and use of a support element, which is introduced in each case between the components which have already been connected to each other in a first step, i.e., which have been riveted together or which have been formed as integral parts of each other, this support element also comprising anvil sections which come to lie behind the set heads of the rivets yet to be set, the components now to be riveted in the second step can be riveted from the accessible front side without the need for access openings in the housing or in the piston. There is therefore no longer any need to provide corresponding holes or to plug them after the riveting. This simplifies production and assembly, both of which become less expensive, and any possible impairments to the strength and or leak-tightness of the assembly are avoided.

The support element preferably comprises exactly as many anvil sections as there are rivets, where the anvil sections, of course, are also to be arranged suitably in space, such as on divisions of a circle corresponding to the arrangement of the rivets. It is also possible, however, for the support element to comprise fewer anvil sections than there are rivets. In the extreme case, it can have only a single anvil section, where, in such a case, the element will have to be repositioned several times during the riveting operation. The support element can be produced out of any suitable material such as plastic or metal or out of a combination of different materials.

It is possible to provide that the support element is or can be removed from the housing-piston assembly after the riveting. Alternatively, it can also be provided that the support element remains in the housing-piston assembly after the riveting and is or can be positioned in a release position, so that the anvil sections of the support element do not interfere with the movement of the piston, especially in the axial direction necessary for actuating the clutch. The support element can for this purpose comprise at least one drive element, on which an element configured to position, preferably to rotate or to shift, the support element, can act. So that the support element can be positioned, the housing-piston assembly can comprise a centering element, which can be inserted into the housing and which comprises at least one counter-drive element for driving the minimum of one drive element of the support element. It is also possible, however, to provide a separate tool with at least one corresponding counter-drive element to position the support element. After the support element has been positioned in the release position, the support element is preferably fixed in place in this position.

The centering element mentioned above can also be used even before the riveting of the second step of the inventive method and can then in advantageous fashion fulfill a centering function, in which it temporarily holds the piston and/or the support element and, for example, holds the support element in the riveting position. After the riveting step, the centering element can be turned, whereupon the support element, as a result of the cooperation between the drive element(s) and the counter-drive element(s), is carried along into the release position. In this position, the centering element can then be fixed in place by welding, for example, or by riveting or by some other type of fastening method, where the support element is thus fixed in place.

In any case, through the appropriate design of the piston or of the housing, the degree to which the support element can be rotated during the rotation step after the riveting operation can be suitably limited, so that the support element cannot be at an incorrect angle when it is fixed in position. If desired, it is also possible for the support element or the centering element to latch or snap onto the housing or onto the piston, so that the support element can be turned only just enough to reach the correct position, after which it remains fixed at the angle which corresponds to the release position. These measures of preventing overrotation can, of course, be provided independently of the concrete design of the support element and can be applied in analogous fashion if the support element is shifted from the riveting position into the release position not by rotation but rather by some other type of movement.

The centering element can be a cover hub, for example, which is to be permanently connected to the central area of a housing cover of the housing-piston assembly. During the operation of the housing-piston assembly, the rotation of the housing cover is transmitted by way of this hub.

Especially the support element which remains in the housing-piston assembly after riveting can be designed in the form of a ring, where the anvil sections can be formed by radial projections on the inner or outer circumference of the ring surrounded by the support element. Alternatively, the support element can be designed in the form of a star, where the anvil sections are formed by the free ends of the star. These free ends can be, for example, the ends of rays or arms of a star-shaped structure, which are designed as anvil sections or on which the anvil sections are arranged. By rotation of the ring or star, the anvil sections can be easily moved out of the riveting position into the release position after riveting has been completed.

Especially when the support element is to be removed from the housing-piston assembly after riveting, the support element can comprise flexible holder elements, on which the anvil sections are provided. These flexible holder elements can be in the form of, for example, bendable wires, flexible plastic or thin sheet-metal elements, or the like, or possibly even chains or cords. They can also consist of individual elements connected movably to each other. The flexible holder elements can, for example, be the previously mentioned rays or arms of a star-like structure. At the end of each of the flexible holder elements, the anvil sections can then be formed as solid plates, such as metal plates. The anvil sections can be integral parts of the holder elements or can be attached to them. It is possible for the flexible holder elements to comprises a lesser thickness than the anvil sections.

Especially but not only when flexible holder elements are not provided, the support element can be produced completely, possibly as a single unit, out of a solid material such as sheet steel. Thin, low-cost sheet steel can preferably be used, where the anvil sections can be given additional strength by doubling the sheet steel in the area of the anvil sections by folding it over, for example.

When flexible holder elements are provided, these can be designed in such a way that they are not equally flexible in all directions. This means that the holder elements are deformable in, for example, a direction which is preferably perpendicular to the direction of the longest dimension of the holder elements so as to make it possible for the flexible holder elements to be introduced into the housing-piston assembly even if this must be done around a curved area, and for them to be less deformable or undeformable in a different direction, preferably a direction which is perpendicular both to the longitudinal direction and to the flexible direction, so that lateral guidance is provided during introduction into the housing-piston assembly. The flexible holder elements can also be designed so that they can be brought into a flexible state to allow the introduction of the support element into the housing-piston assembly and into an inflexible state for the riveting operation. As a result, it becomes possible to insert the holder elements and thus the anvil sections easily into the housing-piston assembly and simultaneously to achieve a stable, fixed positioning of the support element in the riveting position.

The flexible holder elements can in particular comprise individual elements or chain links connected movably to each other. These individual elements or chain links can be connected to each other by a belt or cable or even by hinges. At least one belt or cable, furthermore, can be guided by several or along several chain links and connected to at least one chain link in such a way that, by pulling the belt or cable, the chain links can be pulled taut. Pulling them taut represents an easy way to achieve an inflexible state of the holder elements, which makes possible the previously described fixation in the riveting position. When the tension is released, the chain links are able to move with respect to each other again, which makes it easier to introduce the holder elements and thus the anvil sections into the housing-piston assembly and also to pull it back out again after the riveting.

The previously mentioned object is also achieved by the provision of an auxiliary device for the riveting of a housing-piston assembly of a coupling device, especially a wet-running multi-plate clutch or a bridging clutch of a hydrodynamic coupling device, which auxiliary device comprises a previously mentioned support element with flexible holder elements, on which the anvil sections are provided.

This auxiliary device can in particular comprise a first centering device for centering the support element in the housing-piston assembly. This centering device can, for example, have the structure of a graduated ring or the like, which can be inserted into an opening in the housing cover, especially the opening provided for the later installation of a cover hub. In this way, it can be ensured that the auxiliary device is correctly positioned in the housing-piston assembly, so that the anvil sections arranged on the flexible holder elements can also be correctly positioned in the riveting position behind the set heads of the rivets.

Alternatively or in addition, a second centering device can be provided, which serves to interact with the piston during the riveting operation with a centering effect. Especially in cases where the second centering device is provided in addition to the first centering device, it can be guaranteed that the piston, which thus assumes a defined position relative to the housing by means of the auxiliary device, can be brought into the correct position for riveting. If the second centering device is provided in place of the first centering device, the correct positioning of the auxiliary device relative to the overall assembly can be adjusted by aligning the piston relative to the connecting elements already riveted to the housing in such a way that the piston can be riveted to the connecting elements, as a result of which the auxiliary device also assumes a defined position relative to the housing. The positioning of the piston relative to the connecting elements can be accomplished by aligning the holes through which the rivets are intended to pass. It is also possible, however, for the rivets to have already been provided on the connecting elements or on the piston before the piston is set in place, so that the rivets offer guides for the piston and thus indirectly also for the auxiliary device. So that the rivets can be held in place at least temporarily on the connecting elements or on the piston, the rivets can be clamped in holes in the connecting elements or in the piston by means of a press-fit, for example. Instead, the rivets could also be permanent parts of the connecting elements or piston in that they have been formed on them.

The auxiliary device preferably comprises guide elements for the acceptance and/or guidance of the flexible holder elements of the support element, where the holder elements are held movably in the guide elements or are guided along the guide elements, so that the anvil sections can be shifted into a rest position and into a riveting position. With guidance of this type, it is possible to position the anvil sections by means of the flexible holder elements in a simple and reliable manner.

It can be provided that the auxiliary device comprises a device for introducing the flexible holder elements into the housing-piston assembly and/or a device for pulling the flexible holder elements out of the housing-piston assembly. This increases the reproducibility of the positioning beyond what is possible by purely manual introduction, and under certain conditions it can decrease the required force, especially the force required to pull the elements out after the riveting operation. For this purpose, a push- and/or pull rod can be provided, which is or can be connected to the support element to introduce and/or to pull out the flexible holder elements. This push- and/or pull rod can be actuated, for example, by means of a lever mechanism.

In the previously described method for assembling a housing-piston assembly, it is possible in particular to use a support element as described above or an auxiliary device as described above. The anvil sections can be brought into the riveting position by introducing the flexible holder elements of the support into the housing-piston assembly along guide elements. In exactly the same way, the anvil sections can be brought back out of the riveting position by pulling them out of the housing-piston assembly along guide elements. Through the use of guide elements, it can be ensured, first, that the anvil elements are positioned correctly in the riveting position and, second, that the anvil sections and the holder elements, as they are being introduced and/or pulled out, do not collide undesirably with components of the housing-piston assembly and possibly cause damage or become jammed, interlocked, or the like.

It can be provided that the flexible holder elements of the support element are converted into an inflexible state either after they have been positioned or so that they can be positioned in the riveting position. As previously explained, it is possible in this way to guarantee that the anvil sections are held securely in the riveting position. It can be provided that the holder elements are converted into the inflexible state only after the anvil sections have been correctly positioned or that the correct positioning is accomplished simultaneously with the conversion to the inflexible state.

Finally, it can be provided that the housing-piston assembly is subjected to an automated inspection process after assembly. Thus it is possible to verify in particular that the riveting has been performed correctly.

The inventive method has been described here as a method for assembling a housing-piston assembly. Nevertheless, a method of this type can also be used for other types of assembly jobs in which the conditions are similar to those present during the riveting of a housing-piston assembly, that is, especially in cases where several elements are to be riveted to each other, namely, elements which make it difficult to impossible to obtain direct access to the set heads of the individual rivets during one of the work procedures. The person of ordinary skill will easily see other possible applications, especially in the area of the assembly of motor vehicles, bicycles, etc. Accordingly, there will also be additional areas of application for the inventive support element or for an inventive auxiliary device.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The present invention is explained in greater detail below on the basis of the figures in which:

FIGS. 4a and 4b show a cross-sectional side view and a top view of an auxiliary device for the riveting of a housing-piston assembly;

FIG. 8 shows a cross-sectional side view of another embodiment of an auxiliary device for riveting;

DETAILED DESCRIPTION OF THE PRESENTLY PREFERRED EMBODIMENTS

Figure 1:
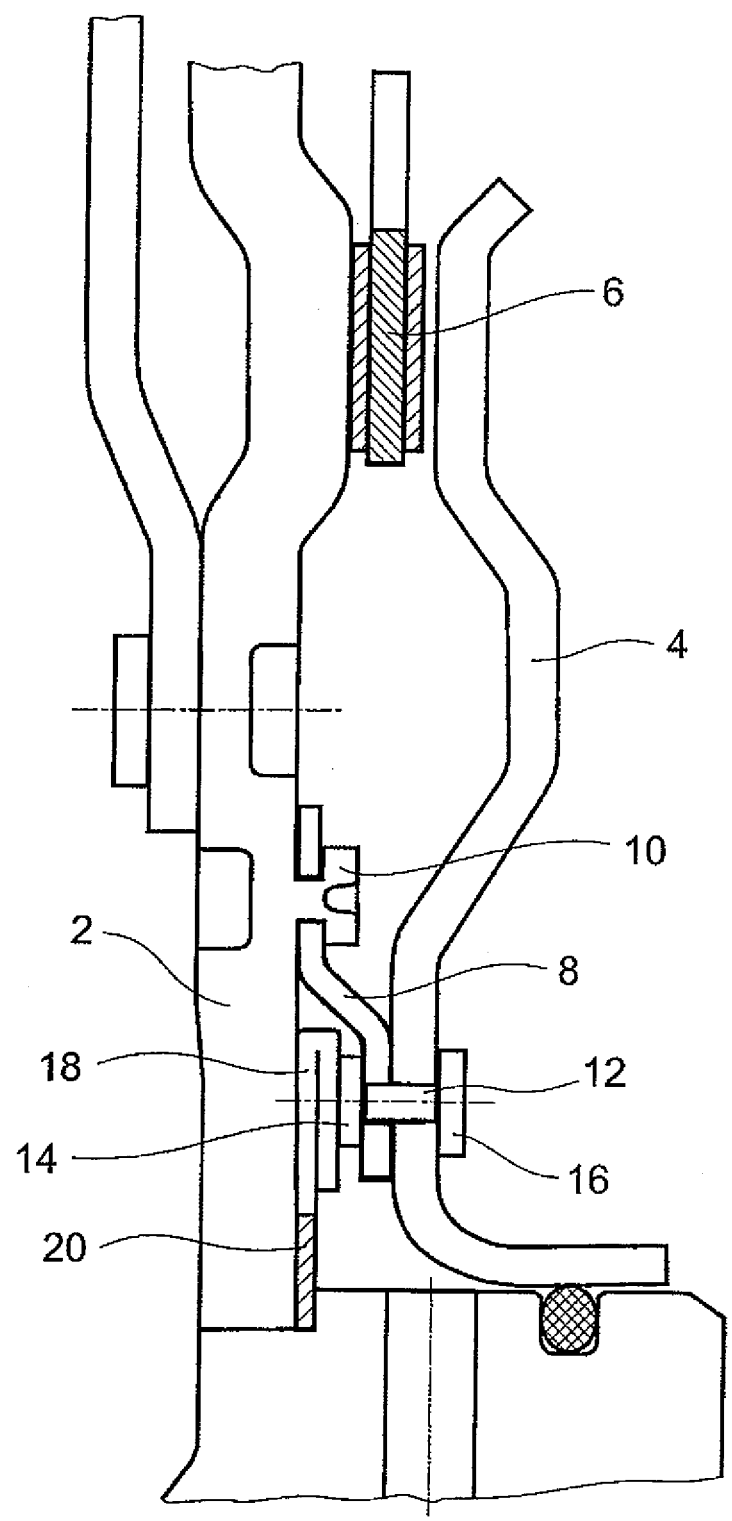
FIG. 1 shows a part of an inventive housing-piston assembly with an inserted support element in the riveting position.

FIG. 1 shows a part of a housing-piston assembly, comprising a housing cover 2, which is part of a housing of a coupling device, such as a wet-running multi-plate clutch or a bridging clutch of a hydrodynamic coupling device; and a piston 4, which can be brought into engagement with a clutch plate 6 by movement in the axial direction, that is, in the direction toward or away from the housing cover 2 to push this plate against the housing cover 2 and thus to establish a nonpositive connection between the housing cover 2 and the clutch plate 6.

The piston 4 is connected to the housing cover 2 by connecting elements 8, which are designed as leaf springs, for example, where the connecting elements 8 are attached to the housing cover 2 by rivets 10. In the present example, the rivets 10 are formed directly on the housing cover 2. The piston 4 in turn is attached to the connecting elements 8 by rivets 12, the set heads 14 of which face the housing cover 2, whereas the closing heads 16 face the freely accessible interior space in front of the piston 4. Between the set heads 14 of the rivets 12 and the housing cover 2 are the anvil sections 18 of a support element 20. In the example shown here, this support element 20 consists of thin material, such as sheet metal, where a double layer of material is present in the anvil sections 18 to achieve the necessary thickness for bridging the distance between the housing cover 2 and the set heads 14 of the rivets 12. Depending on the material thickness or size of the gap to be bridged, of course, the material can be folded over several times, or the anvil sections can be designed as separate blocks, which are attached to the support element 20.

To assemble the housing-piston assembly shown here, the connecting elements 8 are first set down on the rivets 10 formed on the housing cover 2 and riveted to them, where, if desired, the rivets 12 for attaching the connecting elements 8 to the piston 4 and the support element 20 can have already been laid in place also. After the connecting elements 8 have been riveted to the housing cover 2, the piston 4 is placed on the connecting elements 8 and the corresponding rivets 12, where, no later than now, the support element 20 must also be brought into the riveting position, i.e., the position in which the anvil sections 18 lie under the set heads 14 of the rivets 12. Then the piston 4 is riveted to the connecting elements 8, where a corresponding tool acts on the closing heads 16 of the rivets 12, the set heads 14 of which are supported against the anvil sections 18 of the support element 20. After riveting has been completed, the support element 20 is moved out of the riveting position, either by removing it from the housing-piston assembly or by pushing or preferably rotating it into a release position, where it is preferably also fixed in place in this release position.

Figure 2:
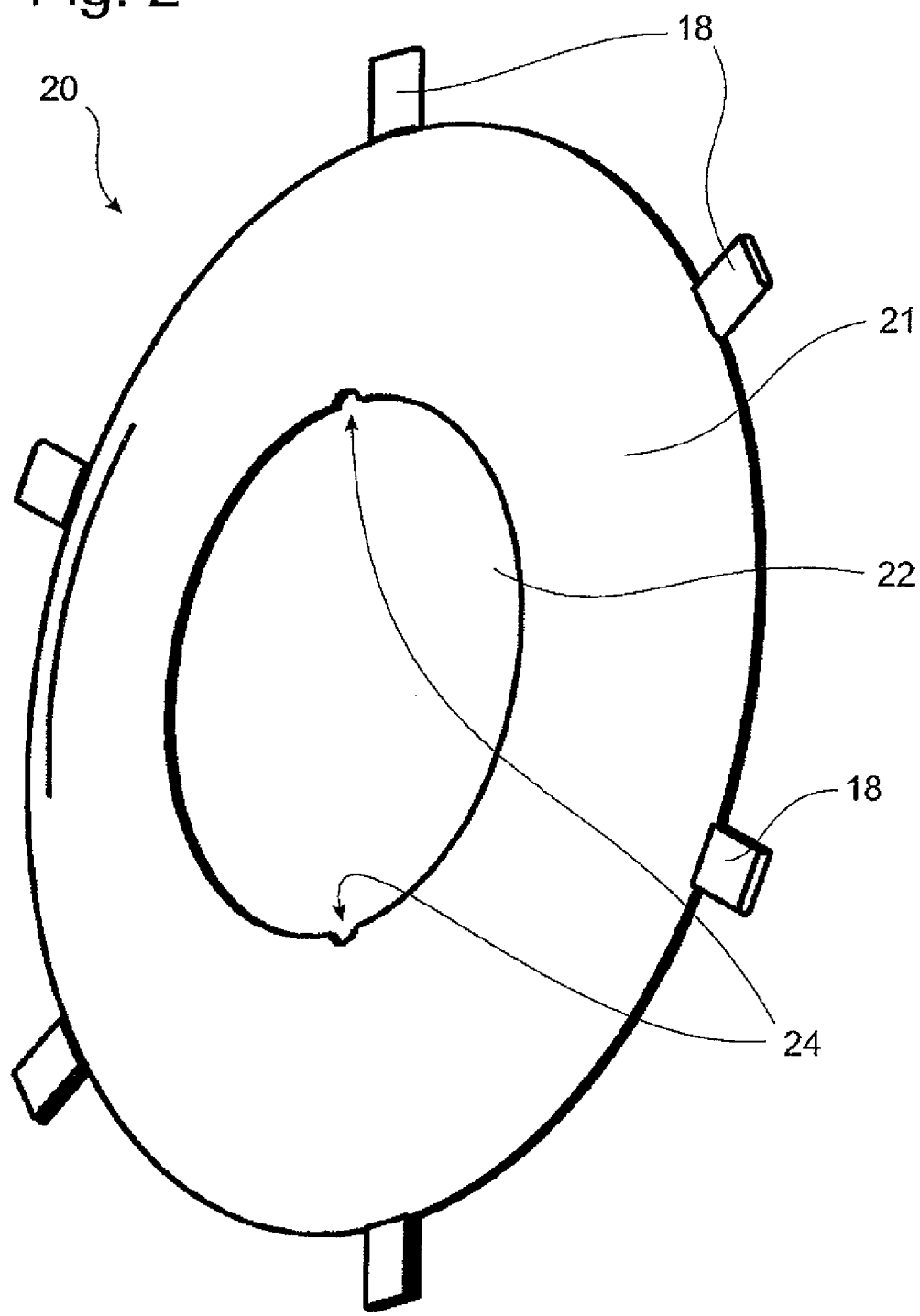
FIG. 2 shows an embodiment of an inventive support element.

FIG. 2 shows an embodiment of a support element 20, which is designed here as a ring-shaped auxiliary piece of sheet metal 20, comprising a support ring 21, on the outer circumference of which several radially projecting anvil sections 18 are located. Like the anvil sections 18 of the support element 20 shown in FIG. 1, these anvil sections 18 are formed with approximately double the thickness of the support ring 21. Because of the ring-shaped design of the auxiliary piece of sheet metal 20, an opening 22 is present in the interior, through which, during the further course of the assembly process, a cover hub, for example, can be inserted into the housing cover 2 (see FIG. 3). On the inner edge facing the opening 22, the auxiliary piece of sheet metal 20 comprises two notches 24, which can serve as drive elements for rotating the auxiliary piece of sheet metal 20 from the riveting position into the release position. This rotation can be accomplished either by means of a tool or, as will be explained in greater detail below, by means of a cover hub to be inserted if desired.

As an alternative to the embodiment of a support element 20 shown in FIG. 2 as a ring-shaped auxiliary piece of sheet metal 20, the support element could also have a star-like shape, where the anvil sections 18 would be located on the free ends of the star. This star-shaped structure can be designed also in the form of a net or as a star of chains, cords, or the like, where in each case appropriate anvil sections are provided on the ends of the chains or cords. Through the use of flexible components in the support element, the element can be pulled back out of the housing-piston assembly after the riveting. This can be done in particular in cases where the piston 4 is to be connected to the connecting elements 8 first or the connecting elements 8 are formed as fixed parts of the piston and the connecting elements 8 are only then riveted to the housing cover 2. In this case, the anvil sections 18 must be located between the rivets 10 used to connect the housing cover 2 to the connecting elements 8 and the piston 4. The support element 20 cannot usually remain in the housing-piston assembly under these conditions.

Figure 3:
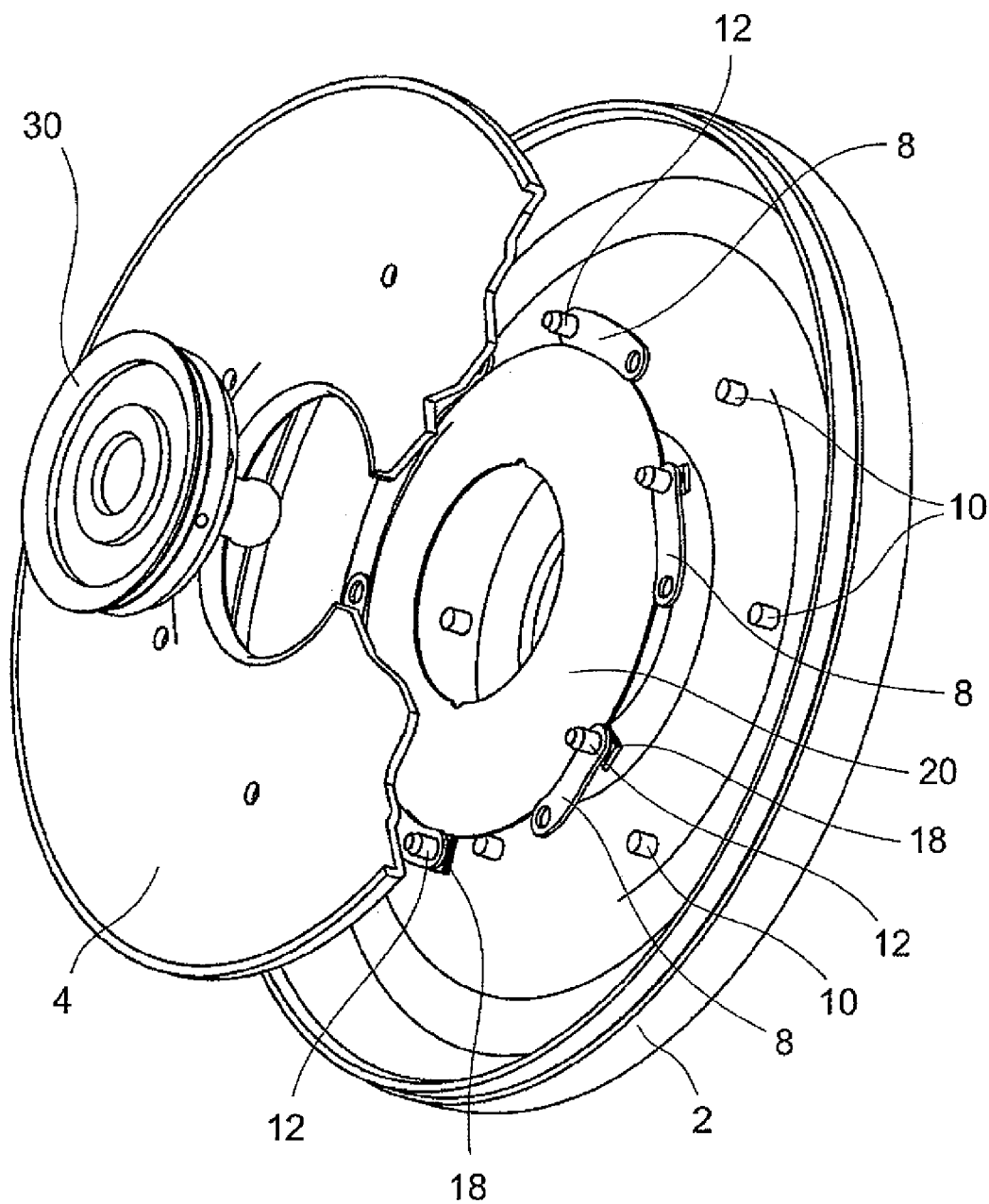
FIG. 3 shows a three-dimensional exploded view of an embodiment of an inventive housing-piston assembly with the support element in the riveting position.

FIG. 3 shows a three-dimensional, exploded view of an embodiment of a housing-piston assembly. A housing cover 2 is shown, which can later close off, for example, the housing of a torque converter or some similar coupling device. A number of rivets 10 are provided on the housing cover 2; in this case, they are formed directly on the housing cover 2. A plurality of leaf spring-like, strap-shaped connecting elements 8, which comprise holes at their ends, through each of which a respective rivet 10 or 12 can pass, serves to connect the housing cover 2 to the piston 4. A support element in the form of a ring-shaped auxiliary piece of sheet metal 20 according to FIG. 2 is arranged in such a way that the anvil sections 18 lie behind the set heads of the rivets 12.

During the assembly process, the connecting elements 8 are now fastened first by means of the rivets 10 to the housing cover 2, where the auxiliary piece of sheet metal 20 can already be put into position during this procedure. Then the piston 4 is set in place and attached by means of rivets 12 to the connecting elements 8, where the closing heads 16 of the rivets 12 are accessible on the free side of the piston 4, whereas each of the set heads 14 of the rivets 12 is supported on one of the anvil sections 18 of the auxiliary piece of sheet metal 20.

After the assembly of the piston 4, the cover hub 30 is inserted. This cover hub 30 can preferably be equipped with projections or the like, which can engage in the recesses 24 in the inner circumferential edge of the ring-shaped auxiliary sheet metal piece 20. When the cover hub 30 is rotated after it has been inserted, the auxiliary sheet metal piece 20 is also carried along by the rotation, so that the anvil sections 18 are swung out of the area of the rivets 12 and of the connecting elements 8, as a result of which the piston 4 now has a certain freedom of movement in the axial direction, that is, in the direction toward the housing cover 2. The auxiliary sheet metal piece 20 is thus now occupying a release position. Finally, the cover hub 30 can be welded from the outside to the housing cover 2, as a result of which the auxiliary sheet metal piece 20 is possibly welded also, but in any case is fixed in the release position by the welded cover hub 30 and thus prevented both from rotating and from moving in the axial direction.

If a cover hub is not provided, an auxiliary device, which is inserted into the inside diameter of the piston 4, can be used to turn the auxiliary sheet metal piece 20 in such a way that the anvil sections 18, again, are rotated out of the area in which the connecting elements 8 move and thus no longer interfere with the stroke of the piston toward the housing cover 2, which means that the auxiliary sheet metal piece 20 has been rotated into a release position. After the auxiliary device has been removed, the auxiliary sheet metal piece 20 remaining in the housing-piston assembly is fixed in place in the housing cover 2 such as by flanging, tack-welding, or riveting in the area accessible through the inside bore of the piston 4.

In any case, through an appropriate design of the piston 4 or of the housing cover 2, the degree to which the auxiliary sheet metal piece 20 can be rotated during the step of rotating it after the riveting operation can be suitably limited, so that it is impossible for the auxiliary sheet metal piece 20 to be at an incorrect angle after it has been fixed in place. If desired, the auxiliary sheet metal piece 20 or possibly a cover hub 30, if provided, can latch or snap onto the housing cover 2 or the piston 4, so that the auxiliary sheet metal piece 20 can be rotated only as far as the correct position and then remain fixed there at the angle which corresponds to the release position. These measures for rotational locking can be provided, of course, independently of the concrete design of the support element and can also be applied analogously in cases where the support element is converted from the riveting position to the release position not by rotation but by some other type of movement.

In an alternative embodiment, not shown in the figures, the housing cover 2 can comprise bores instead of formed rivets 10. The piston 4 can be held on the housing cover 2 by a spring plate with tongues, which fulfills the function of the connecting elements 8, or by some other embodiment of the connecting elements. Instead of an auxiliary sheet metal piece 20 remaining in the housing-piston assembly, it is possible to use here a removable, flexible auxiliary means, which, for example, can be a thin sheet-metal star, a network or star made of small chains with a number of thickened areas or attached disks as anvil elements, equal in number to the number of rivets, to serve as backing between the rivets and the piston 4.

During the assembly process, the side of the spring plate facing the housing cover 2 is riveted to the piston 4 first. Under certain conditions, when necessary for space reasons, for example, it may be necessary for the rivets for the riveting of the spring plate to the housing cover 2 to be already in place, where their set heads will be facing the piston 4. The removable auxiliary means with the anvil elements, that is, for example, the disks, will also already be lying between the set heads of the rivets and the piston. This preassembled unit is now laid in the housing cover 2, so that the rivets project through the bores in the housing cover 2. Then the rivets are riveted onto the piston 4 from the outside of the housing cover by opposing pressure. The auxiliary means can now be removed through the inside bore of the piston 4. In this case, the holes in the housing cover are closed off by the rivets; in contrast to the cited prior art, no access holes in the piston 4 are required.

Of course, a support element different from the illustrated auxiliary sheet metal piece 20 can be used in the embodiment according to FIG. 3, and this support element can either be removed or allowed to remain in the housing-piston assembly. The design of the housing-piston assembly shown, furthermore, is not mandatory either; in particular, the connecting elements between the piston 4 and the housing cover 2 can be designed differently.

FIGS. 4a and 4b show a cross-sectional side view and a top view of an auxiliary device for the riveting of a housing-piston assembly. This auxiliary device comprises an essentially cylindrical base body 32 with guide tracks 34 formed in it for the flexible holder elements 36. These guide tracks 34 exit the base body 32 near its bottom end, in the radially outward direction. From this exit opening, they proceed in an arc to the center of the base body, where they lead axially to a bore 38, which opens out at the end of the base body 32 opposite the end where the guide tracks 34 emerge. At the ends of the holder elements 36 projecting out beyond the exit points of the guide tracks 34, the anvil sections are formed, which can be positioned under the set heads 14 of the rivets 12 for the riveting operation (see FIGS. 1 and 3). These anvil sections can be separate elements which are attached to the ends of the holder elements 36. It is also possible, however, for the last part of each of the holder elements 36 to be designed as an anvil section, that is, for it to be designed in particular with the necessary thickness and strength.

Figures 5A, 5B, 5C:
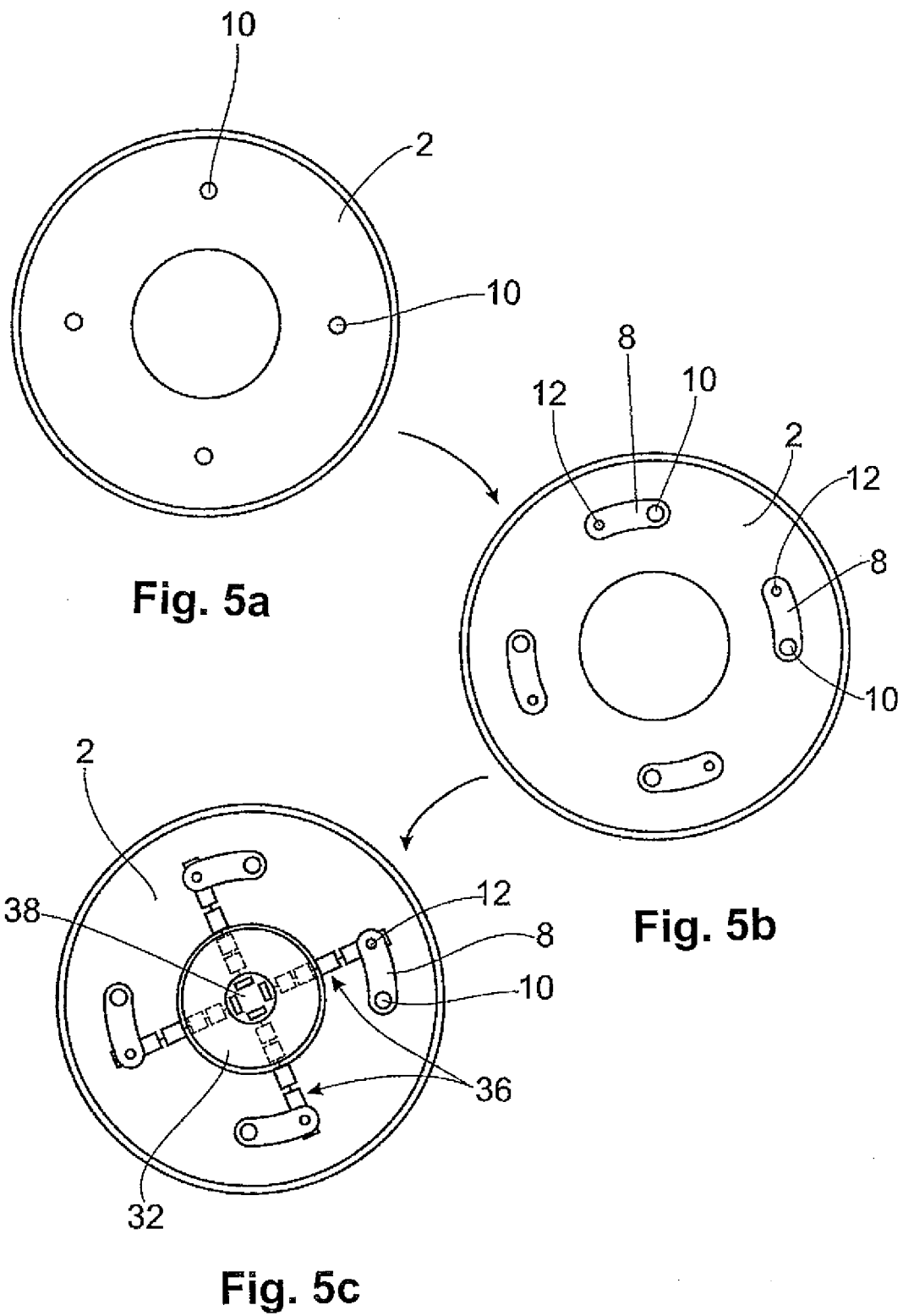
FIGS. 5a, 5b and 5c show a view of the sequences of steps involved in the riveting of a housing-piston assembly by the use of an auxiliary device according to FIG. 4.

FIGS. 5a, 5b and 5c show the sequence of steps conducted during the riveting of a housing-piston assembly. Elements which corresponds to those of FIGS. 1-4 are identified by the same reference numbers. The housing cover 2 shown here with the rivets 10 provided on it corresponds essentially to the housing cover 2 shown in FIG. 3. First, the holes provided in the connecting elements 8, which are designed in the manner of leaf springs, are set onto the rivets 10, and the elements are riveted to the housing cover 2. Then the auxiliary device shown in FIG. 4 is set onto the housing cover 2 in such a way that the bottom end of the base body 32 fits into the opening in the housing cover 2 provided for the later acceptance of the cover hub. As a result, the auxiliary device is centered and correctly positioned on the housing cover. The flexible holder elements 36 are now guided across the housing cover 2 in such a way that the anvil sections located at their ends come to lie behind the set heads of the rivets 12 for the riveting of the connecting elements 8 to the piston 4 (not shown here). It can be provided in particular that the rivets 12 are already arranged on the connecting elements 8 before the positioning of the flexible holder elements 36. For this purpose, the rivets 12 can be either formed on the connecting elements 8 or inserted through corresponding bores in the connecting elements 8. In this case, the rivets 12 are preferably clamped in the bores, such as by a press-fit.

Alternatively, the sequence of steps can be planned out so that, even before the riveting of the rivets 10 between the connecting elements 8 and the housing cover 2, the auxiliary device is inserted and the flexible holder elements 36 with the anvil sections attached thereto are brought into the riveting position. Then the connecting elements 8 with the rivets 12 are set down onto the rivets 10, so that the set heads of the rivets 12 come to lie on the anvil sections of the flexible holder elements 36, whereupon the rivets 10 are riveted first.

In any case, the piston 4 (not shown) is set down after the holder elements 36 have been positioned and after the rivets 10 have been riveted. For this purpose, the piston 4 is upended over the base body 32 of the auxiliary device and centered by it. By means of an appropriate rotation, the holes provided in the piston 4 can now be brought into alignment with the rivets 12. Then the rivets 12 are riveted, and thus the piston 4 is fixed permanently in place on the connecting elements 8.

After the riveting, the flexible holder elements 36 are pulled out from above through the central bore 38 in the base body 32 of the auxiliary device, so that the piston, supported by the connecting elements 8, now has a certain freedom of movement in the axial direction of the housing-piston assembly. As soon as the flexible holder elements 36 have been pulled completely out of the area of the piston, the auxiliary device can be removed. Thus the riveting operation is completed.

In an alternative sequence of steps, the connecting elements 8 can be premounted by the rivets 12 on the piston 4, so that, in a second step, the connecting elements 8 must be riveted to the housing cover 2 by means of the rivets 10. For this purpose, the rivets 10 are inserted through corresponding bores in the connecting elements 8 or are already provided on the connecting elements 8 and pass through bores in the housing cover 2, so that they can be riveted from the outside surface of the housing cover 2. The set heads of the rivets 10 thus face the piston 4. Then the auxiliary device with its base body 32 can be inserted into the central bore of the piston 4, and the flexible holder elements 36 can be shifted in such a way that the anvil sections come to rest behind the set heads of the rivets 10, that is, between the connecting elements 8 and the piston 4. The rivets 10 which have been supported in this way can then be riveted from the outside surface of the housing cover 2.

If desired or if necessary, the riveting can be inspected automatically by visual means, for example. This inspection depends on which set of rivets is riveted first. For example, if the rivets 10, which connect the housing cover 2 to the connecting elements 8, are riveted first, the inspection is preferably performed before the piston 4 is set in place. After the second riveting step, e.g., the riveting of the piston 4 to the connecting elements 8 by the rivets 12, these rivetings can then be inspected.

Figure 6A:
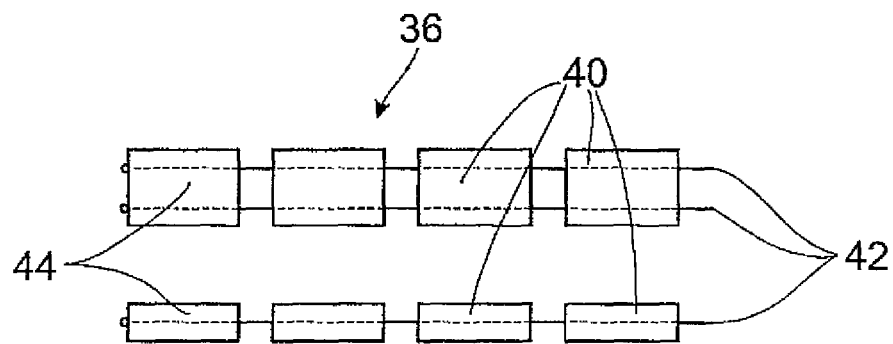
FIGS. 6a, 6b, and 6c show various embodiments and configuration of flexible holder elements of an invention support element.

FIG. 6a shows a top view and a side view of an embodiment of a flexible holder element 36, which, for example, can be used in an auxiliary device of FIG. 4. This holder element 36 consists of a series of individual elements or chain links, which here are small plates 40 of plastic, metal, or the like. The plates 40 are connected to each other by two cords or wires 42, which pass through corresponding bores in the plates. The cords or wires 42 are connected to the end plate 44 in such a way that the end plate 44 cannot be moved beyond the ends of the cords or wires 42. The end plate 44 serves here simultaneously as an anvil section for the riveting operation. For this purpose, the end plate 44 is preferably designed with the appropriate thickness and material properties.

The plates 40 are arranged basically so that they can slide along the cords or wires 42, so that, in the normal case, they are at most simply resting loosely against one another and thus can move relative to each other so as to give the holder element 36 a certain flexibility. When now the plates 40 are pushed together from the end of the cords or wires 42 opposite the end plate 44, their end surfaces come to rest against each other, and the flexibility of the holder element 36 decreases as a function of the amount of force exerted. In this way, the holder element 36 can be brought into an inflexible state for the riveting, a state in which the end plate 44 serving as the anvil section is kept in position as reliably as possible.

Figure 6B:
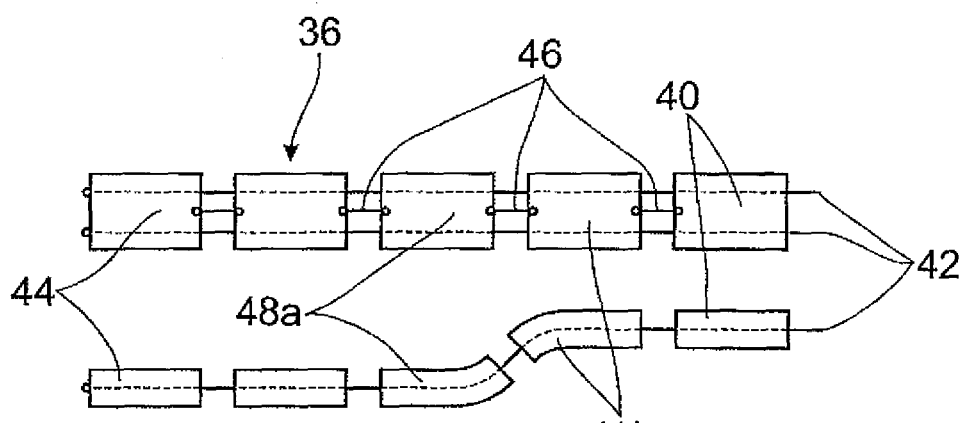

FIG. 6b also shows a top view and a side view of an alternative embodiment of a flexible element 36. The basic design of the holder element 36 of FIG. 6b is the same as that of the flexible holder element 36 of FIG. 6a. The plates 40, however, are also connected to connecting elements 46, which can be cords or wires; here, for example, one such cord or wire is between each pair of plates. There are also two plates 48a, 48b in the central area of the holder element 36, which are bent up and over in opposite directions. In this way, even when in an inflexible state, the holder element 36 can pass over a step (see FIG. 6c), which, for example, can be present at the exit points of the guide tracks 34 of the auxiliary device shown in FIG. 4. In the state shown in FIG. 6b, the individual plates 40, 48a, 48b comprise a certain distance from each other; that is, they lie loosely along the cords or wires 42, so that the holder element 36 here is in a flexible state.

Figure 6C:
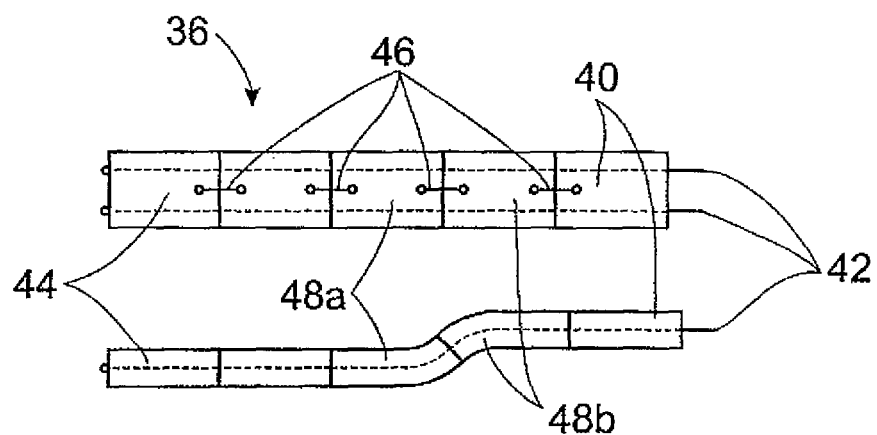

FIG. 6c shows a top view and a side view of the flexible holder element 36 of FIG. 6b but after it has been converted into an inflexible state. For this purpose, the plates 40, 48a, 48b are moved along the cords or wires 42 until their end surfaces meet each other and the mobility of the plates 40, 48a, 48b with respect to each other is limited by the applied force. For this purpose, either the plates 40 can be pushed together from the end of the holder element 36 which is opposite the end plate 44, or the plate 40 located at this end can be held tight and used to pull on the cords or wires. As can be seen especially clearly in the side view of FIG. 6c, the bent elements 48a, 48b produce a step in the holder element 36, especially in the inflexible state shown here, by means of which a corresponding step, already explained above, can be overcome. Depending on the concrete geometry of the housing-piston assembly to be riveted and/or of the selected auxiliary device, of course, it is also possible to provide various other designs by which steps of different heights, by which several steps, or by which roundings, etc., can be overcome.

Figure 7A:
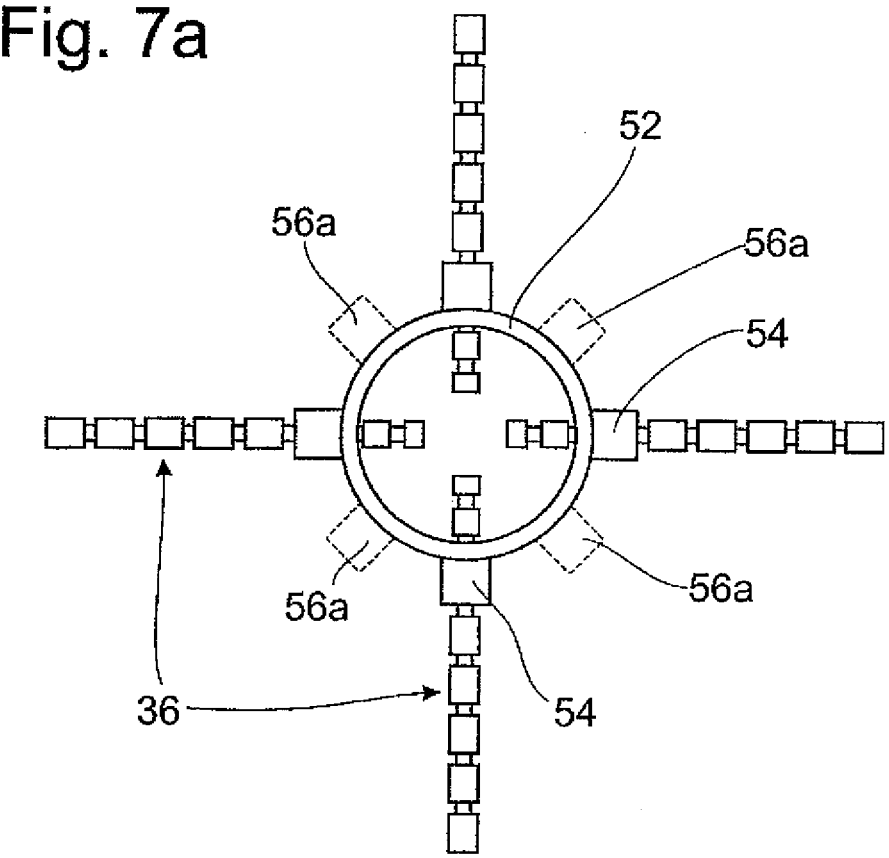
FIGS. 7a and 7b show a top view and cross-sectional side view of another embodiment of an auxiliary device for riveting.
Figure 7B:
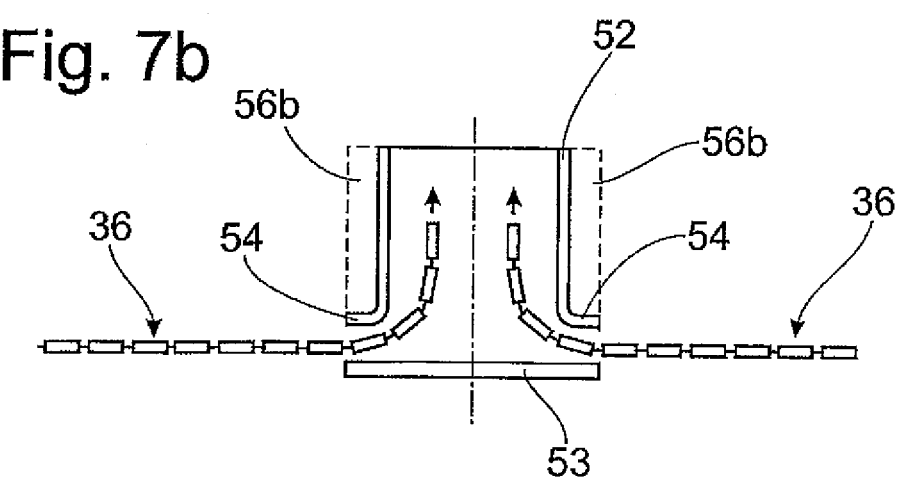

FIGS. 7a and 7b show a top view and a cross-sectional side view of an embodiment of an auxiliary device for riveting representing an alternative to that shown in FIGS. 4a and 4b. The auxiliary device shown here comprises again a hollow cylindrical base body 52, one end of which is closed off by a bottom plate 53. At the end closed off by the bottom plate 53 there is a plurality of guide sleeves 54, which are open toward the interior of the base body 52 and also radially to the outside. Flexible holder elements 36, similar to those explained on the basis of FIGS. 4a and 4b, can be passed through these guide sleeves 54.

The auxiliary device illustrated here is used in basically the same way as the auxiliary device of FIG. 4, i.e., in the way described in connection with FIGS. 5a-c. Nevertheless, it must be kept in mind that, in cases where the piston to be riveted is placed in such a way on the base body 52 that it is guided by it, the auxiliary device can be removed after the riveting only from the side of the housing cover 2 facing away from the piston 4. Thus the diameter of the auxiliary device, including the guide sleeves 54, must also be adapted to the opening in the housing cover. An alternative would be to provide additional guide elements on the base body 52 to increase the diameter of the base body to an appropriate extent. The piston can then be supported on these guide elements, which can be in the form of the spacer elements 56*a*, 56*b*, shown in broken line in FIGS. 7*a* and 7*b*.

FIG. 8 shows a cross-sectional side view of another embodiment of an auxiliary device for riveting. This consists of a cylindrical base body 62, in which a push-pull rod 64 is provided, which is supported so that it can move up and down in the axial direction. This push-pull rod is provided at its upper end with a set of teeth, with which corresponding sets of opposing teeth of two lever elements supported movably on the base body 62 engage. By actuation of the lever elements 68, the push-pull rod 64 can be moved in the axial direction in the base body 62.

A support element 70 for riveting is connected to the bottom end of the push-pull rod 64. This comprises a central ring-shaped body 72, which is or can be connected to the push-pull rod 64 and on which several flexible holder elements 66 are movably attached. Anvil sections 74, which can be positioned behind the set heads of the corresponding rivets for the riveting operation, are again provided at the end of the movable holder elements 66. Moving the push-pull rod 64 upward has the effect of pulling the flexible holder elements 66 into the interior of the base body 62, whereas a corresponding downward movement of the push-pull rod 64 has the effect of pushing the holder elements out of the base body 62. For this purpose, the base body 62 comprises openings at its bottom end for the passage of the flexible holder elements 66. At the edge of these openings, guide elements 76 are provided, which are intended to guide the flexible holder elements 66 in particular in such a way that they do not collide undesirably with components of the housing-piston assembly to be riveted together.

The sequence of steps for riveting with the device shown in FIG. 8 deviates from that discussed in connection with FIGS. 5*a-c* to the extent that, because of the lever elements 68, the piston cannot be set down over the top of the auxiliary device. What must be done, therefore, is to push the piston onto the base body 62 from the bottom side of the auxiliary device, preferably with the holder elements 66 in the pulled-in position, before the piston is riveted to the connecting elements. Then the auxiliary device, with the piston in the pushed-on position, is set down on the housing cover, and then, by actuation of the lever elements 68, the flexible holder elements 66 are moved outward, so that the anvil sections 74 come to lie behind the corresponding rivets. After the piston has been riveted to the connecting elements or the connecting elements have been riveted to the housing cover in correspondence with the variants of the process sequence described in connection with FIGS. 5*a-c*, the lever elements 68 are actuated to pull the push-pull rod 64 upward, so that the flexible holder elements 66 and thus the anvil sections 74 are pulled back into the interior of the base body 62. The auxiliary device can now be removed.

The introduction of the holder elements 66 by means of the push-pull rod 64 and the lever elements 68 offers the advantage that the anvil sections 74 can be positioned accurately reproducibly. This can be ensured, for example, by providing a mark to indicate the position which the lever elements 68 of the push-pull rod 64 are intended to assume. If, after the riveting, the anvil sections 74 are still clamped between the set heads of the rivets and the housing cover, then, thanks to the lever elements 68, a sufficiently strong force can always be applied to pull the flexible holder elements 66 out of the housing-piston assembly and to release the piston.

In the case of the auxiliary device according to FIG. 8, the presence of the piston even before the auxiliary device is set onto the housing cover means that the flexible holder elements 66 are no longer visible. To ensure that the anvil sections 74 nevertheless assume the correct position behind the set heads of the rivets, marks can be made on the auxiliary device to indicate the exit points of the holder elements 66 from the base body 62. Thus the holder elements can be brought into alignment with, for example, the holes in the piston intended for riveting or with corresponding marks on the housing-piston assembly.

It is also possible for the holder elements 66 to be spring-loaded in such a way that that the holder elements 66 are pushed radially outward, away from the base body 62. Thus, when the holder elements 66 travel outward from the base body 62, they move in the radially outward direction, that is, toward the riveting position.

It should be pointed out that, in all of the embodiments of an auxiliary device for riveting, the mutual centering between the housing cover and the piston required for precise riveting can be accomplished in two different ways. According to one possibility, the auxiliary device can be centered on the housing cover when it is set down on it, such as by the provision of suitable support elements. When the piston is then centered on the auxiliary device, such as on its base body 32, 52, or 62 or on corresponding spacer elements 56*a* or 56*b*, the correct centering between the piston and the housing cover is obtained automatically. The piston must merely be turned into the correct position, e.g., until the holes provided become aligned with the holes in the connecting elements or with the rivets inserted into these holes or provided on the connecting elements. In the case that the auxiliary device is centered on the housing cover, however, there is no absolute necessity to provide additional centering for the piston on the auxiliary device, because, as a result of the previously existing fixed position of the connecting elements with their corresponding rivets, the piston can occupy only one defined position.

It is also possible, however, for the auxiliary device for riveting to be neither supported on the housing cover nor centered on it. In this case, an indirect centering can be accomplished in that the piston is guided and centered on the auxiliary device, that is, again, for example, on its base body 32, 52, or 62 or on corresponding spacer elements 56*a*, 56*b*. As a result, the auxiliary device occupies a defined position in relation to the housing cover in that the piston, as just described, must occupy a defined position in relation to the connecting elements and the rivets provided on them.

Figure 9:
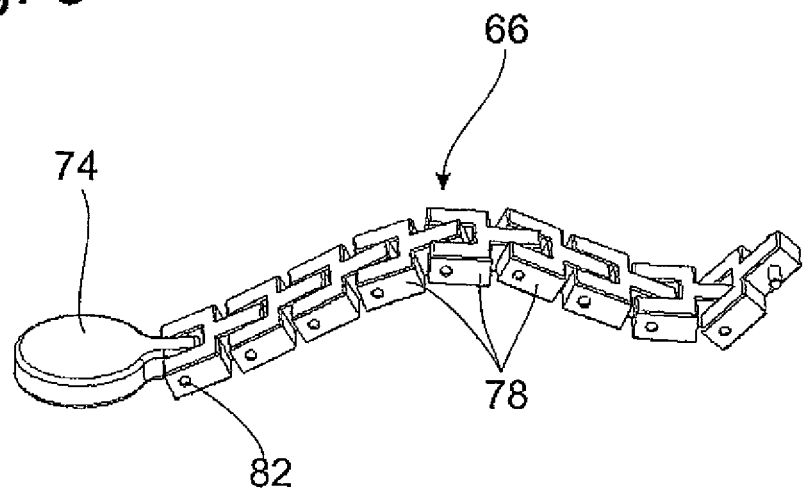
FIG. 9 shows a flexible holder element with an anvil section attached to one end, especially for use in an auxiliary device according to FIG. 8.

FIG. 9 shows a flexible holder element 66 from the auxiliary device of FIG. 8. This holder element 66 consists of a plurality of chain links 78, connected to each other by joints, where, at the end of the holder element 66, a plate-shaped anvil section 74 is provided. In this example, the chain links 78 are in the form of two-tined forks, where each base of a chain link 78 is introduced between the tines of the adjacent chain link 78 and held in place there by a pin 82 passing through the tines and the base or by two pins 82 projecting from the base. The base of a chain link 78 is therefore able to rotate with one degree of freedom relative to the tines of the adjacent chain link 78. Thus the flexible holder element 66 discussed here comprises a mobility only in one direction and is inflexible in the other direction. When the auxiliary device shown in FIG. 8 is used, the flexible holder element 66 can thus be bent around out of the interior of the base body 62 and past the guide elements 76, so it can then be pushed along the housing cover into the riveting position. As a result of the lack of flexibility in all other directions, it can be ensured that, when the flexible holder element 66 is pushed forward, the desired direction will be maintained, so that its anvil section 74 will come to lie under the corresponding set head of its associated rivet with good positional accuracy.

Figure 10:
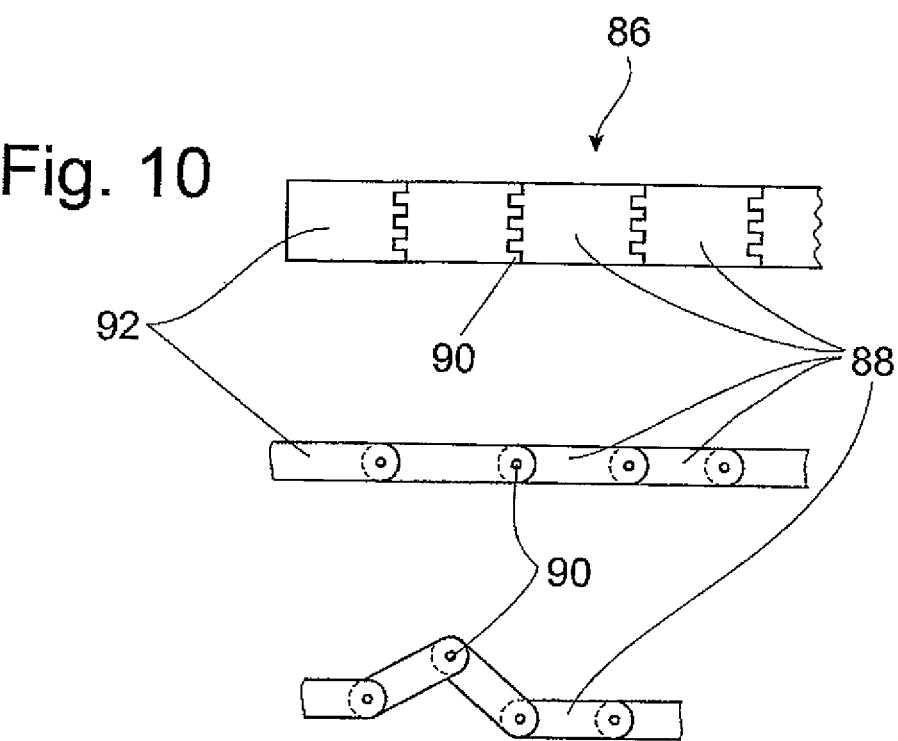
FIG. 10 shows an alternative embodiment of a flexible holder element.

Another embodiment of a flexible holder element 86 is shown in FIG. 10. This consists again of several chain links 88, which are connected by hinges 90, so that a similar mobility as that of the holder element 66 illustrated in FIG. 9 is obtained. In this case, the last chain link 92 can again serve simultaneously as an anvil element.

It should be emphasized that basically all of the holder elements 36, 66, and 86 shown in the figures could be used in any of the auxiliary devices shown or even used alone. Thus each holder element 36, 66, or 86 can form a support element according to the present invention. It is also possible, however, for a support element, e.g., the support element 70 of FIG. 8, to comprise one or more flexible holder elements. An individual element or chain link of a flexible holder element can simultaneously serve as an anvil section, or a separate anvil section can be provided on a flexible holder element. The flexible holder elements and auxiliary devices shown here, furthermore, are to be understood merely as examples. A person of ordinary skill will see immediately that, depending on the area of application and the concrete design of the housing-piston assembly to be riveted, a large number of other variants can be imagined.

The skilled person will also see that the support elements and auxiliary devices discussed here can also be used for other assembly purposes, not just for riveting housing-piston assemblies.

The invention is not limited by the embodiments described above which are presented as examples only but can be modified in various ways within the scope of protection defined by the appended patent claims.

We claim:

1. A housing-piston assembly for a coupling device, comprising
   a housing (2);
   connecting elements (6);
   a piston (4) attached to said housing (2) by means of said connecting elements (8) in such a way that said piston has a certain freedom of movement;
   rivets (10, 12) having a set head and serving as fastening elements between one of said piston (4) and said connecting elements (8), and between said connecting elements (8) and said housing (2); and
   at least one support element (10, 36, 70, 86) including an anvil section (18, 44, 74, 92); said at least one support element (20, 36, 70, 86) positionable in a riveting position between one of said piston (4) and said connecting elements (8), and between said connecting elements (8) and said housing (2) in such a way that said anvil section (18, 44, 74, 92) of said support element (20, 36, 70, 86) lies behind said set head (14) of said rivet (10, 12),
   wherein said support element remains in said housing-piston assembly after riveting and can be positioned in a release position in such a way that said anvil section of said support element does not interfere with a movement of said piston.

2. The housing-piston assembly according to claim 1, wherein said connecting elements (8) are spring elements.

3. The housing-piston assembly according to claim 1, wherein said the support element (36, 70, 86) can be removed from said housing-piston assembly after riveting.

4. The housing-piston assembly according to claim 1, said support element (20) is constructed to be turned into a release position after riveting.

5. The housing-piston assembly according to claim 1, wherein said support element (20) comprises at least one drive element (24) for interaction with an element designed for the positioning of said support element (2).

6. The housing-piston assembly according to claim 5, additionally comprising a centering element for insertion into said housing (2), said centering element comprising at least one opposing drive element for interaction with said at least one drive element (24) of said support element (20).

7. The housing-piston assembly according to claim 6, wherein said centering element is a cover hub (30) permanently connectable to a central area of said housing cover (2).

8. The housing-piston assembly according to claim 1, wherein said support element (20) is ring-shaped; and said anvil sections (18) are formed by radial projections.

9. The housing-piston assembly according to claim 1, wherein said support element (20, 70) is a star-shaped; and said anvil sections (18, 74) are formed on the free ends of the star.

10. The housing-piston assembly according to claim 1, wherein said support element (20, 36, 70, 86) comprises flexible holder elements (36, 66, 86); and said anvil sections (18, 44, 74, 92) are provided on said flexible holder elements.

11. The housing-piston assembly according to claim 1, additionally comprising an auxiliary device for the positioning of said anvil sections (18, 44, 74, 92) in the riveting position.

12. A support element (20, 36, 70, 86) for use in a housing-piston assembly for a coupling device to support a set head of a rivet in a riveting position, comprising
   anvil sections (18, 44, 74, 92) positionable in the housing-piston assembly in the riveting position of said support element (20, 36, 70, 86) between one of a piston (4) and a connecting element (8) and between a connecting element (8) and a housing (2) behind the set head (14) of the rivet (10, 12),
   wherein said support element remains in said housing-piston assembly after riveting and can be positioned in a release position in such a way that said anvil sections of said support element does not interfere with a movement of said piston.

13. The support element (20, 36, 70, 86) according to claim 12, wherein said anvil sections (18, 44, 74, 92) are one of coated and hardened.

14. The support element (20) according to claim 12, additionally comprising at least one drive element (24) for interaction with an element designed for the positioning of said support element (20).

15. The support element (20) according to claim 12, wherein said support element (20) is ring-shaped; and said anvil sections (18) are formed by radial projections.

16. The support element (20, 36, 70, 86) according to claim 12, wherein said support element (20, 36, 70, 86) is star-shaped; and said anvil sections (18, 44, 74, 92) are formed on the free ends of the star.

17. The support element (36, 70, 86) according to claim 12, wherein said support element (36, 70, 86) comprises flexible holder elements (36, 66, 86); and said anvil sections (44, 74, 92) are provided on said flexible holder elements.

18. The support element (36, 70, 86) according to claim 17, wherein said flexible holder elements (36, 66, 86) are thinner than said anvil sections (44, 74, 92).

19. The support element (36, 70, 86) according to claim 17, wherein said flexible holder elements (36, 66, 86) are not equally flexible in all directions.

20. The support element (36, 70, 86) according to claim 17, wherein said flexible holder elements (36, 66, 86) are constructed so that said holder elements can be brought into a flexible state for the introduction of said support element (36, 70, 86) into the housing-piston assembly and into an inflexible state for the riveting operation.

21. The support element (36, 70, 86) according to claim 17, wherein said flexible holder elements (36, 66, 86) comprise individual chain links (40, 78, 88) connected movably to each other.

22. The support element (36, 70, 86) according to claim 21, wherein said chain links (40, 78, 88) are connected to each other by a flexible member.

23. A support element (36, 70, 86) according to claim 22, characterized in that at least one flexible member is guided through several chain links (40, 78, 88) and is connected to at least one chain link (44), in such a way that the chain links (40, 78, 88) can be clamped against each other by pulling on the flexible member.

24. The support element (70, 86) according to claim 21, characterized in that the chain links (78, 88) are connected to each other by hinges (82, 90).

25. An auxiliary device for riveting a housing-piston assembly for a coupling device, comprising a support element (36, 70, 86) according to claim 17.

26. The auxiliary device according to claim 25, additionally comprising a first centering device for centering said support element (36, 70, 86) in the housing-piston assembly.

27. The auxiliary device according to claim 26, additionally comprising a second centering device (32, 52, 56a, 56b, 62) for cooperating with the piston with a centering effect during the riveting operation.

28. The auxiliary device according to claim 25, additionally comprising guide elements (34, 54, 76) for guiding said flexible holder elements (36, 66, 86) of said support element (36, 70, 86), and wherein said holder elements (36, 66, 86) are guided along said guide elements (34, 54, 76) so that said anvil sections (44, 74, 92) can be moved into a rest position and into a riveting position.

29. A method for assembling a housing-piston assembly of a coupling device, wherein the piston (4) is attached to a housing (2) by means of connecting elements (8) in such a way that the piston has a certain freedom of movement, and rivets (10, 12) are provided as fastening elements between the piston (4) and the connecting elements (8) and/or between the connecting elements (8) and the housing (2), said method comprising:

in a first step, providing the connecting elements (8) on one of the piston (4) and on the housing (2); and, in a second step, riveting the connecting elements (8) to the other one of the housing (2) and to the piston (4);

whereby, before the riveting, in the second step, at least one support element (20, 36, 70, 86) is positioned in a riveting position between the connecting elements (8) and the other one of the piston (4) and the housing (2), in such a way that anvil sections (18, 44, 74, 92) of the support element (20, 36, 70, 86) come to lie behind the set heads (14) of their associated rivets (10, 12); and riveting the connecting elements (8) to the other one of the piston and housing, wherein said support element remains in said housing-piston assembly after riveting and can be positioned in a release position in such a way that said anvil section of said support element does not interfere with a movement of said piston.

30. The method according to claim 29, wherein the support element (36, 70, 86) comprises flexible holder elements (36, 66, 86); and the anvil sections (44, 74, 92) are provided on said flexible holder elements.

31. The method according to claim 30, comprising bringing the anvil sections (44, 74, 92) into the riveting position by introducing the flexible holder elements (36, 66, 86) of the support element (36, 70, 86) along guide elements (34, 54, 76) into the housing-piston assembly.

32. The method according to claim 30, additionally comprising converting the flexible holder elements (36, 66, 86) of the support element (36, 70, 86) into an inflexible state after the holder element have been positioned in the riveting position.

33. The method according to claim 29, additionally comprising subjecting the housing-piston assembly to an automated inspection process after assembly.

\* \* \* \* \*